Patented Oct. 29, 1946

2,410,101

UNITED STATES PATENT OFFICE 2,410,101

WAX-FREE PYRETHRIN SOLUTIONS

Joseph D. Park, Wilmington, Del., and William W. Rhodes, Westtown, Pa., assignors to Kinetic Chemicals, Inc., Wilmington, Del., a corporation of Delaware No Drawing. Application January 6, 1944, Serial No. 517,260

3 Claims. (Cl. 167—24)

This invention relates to solutions of pyrethrins which are stable in the presence of iron.

Solutions of pyrethrins, the active ingredients of pyrethrum flowers, are mixed with liquids volatilizable at normal atmospheric temperatures and enclosed in containers having orifices through which the contents may be discharged at will as a fine spray. The containers are usually made of iron because the volatility of the propellant liquid requires a container capable of withstanding pressure. The propellant solutions are usually made up from standard pyrethrin extracts and, after mixture with the propellant liquid, contain about 93% by weight of $CCl_2F_2$ as the propellant, about 1% of pyrethrins 1 and 2, about 4% kerosene and inert ingredients, and about 2% sesame oil. The mixture of the pyrethrin solution with $CCl_2F_2$ usually results in the precipitation of a waxy material which is filtered off to prevent it from clogging the orifice of the container. The filtrate, when enclosed in an iron container, precipitates additional amounts of waxy material upon standing. These additional amounts of waxy material are sufficient to clog the type of orifice used to produce an effective spray.

It is an object of this invention to prepare propellant solutions of pyrethrins which are stable in the presence of iron. Other objects of the invention are in part apparent and will be in part set forth hereinafter.

The objects of the invention are accomplished, generally speaking, by subjecting the propellant solution to a temperature between about $-10°$ and about $-30°$ C. until the wax precipitation has ceased, and filtering the wax from the chilled solution. The solution so prepared is stable in the presence of iron.

The following examples illustrate the invention but do not limit it.

Example I

Definite amounts of a commercial grade of partially dewaxed 20% kerosene extract of pyrethrum flowers containing sesame oil were placed in a high-pressure glass vessel and the vessel then evacuated. Sufficient $CCl_2F_2$ was then added to make an insecticidal solution of the following composition:

| | Per cent by weight |
|---|---|
| $CCl_2F_2$ | 93 |
| Pyrethrins I and II | 1 |
| Sesame oil | 2 |
| Inert+kerosene | 4 |

Immediate precipitation of insoluble fats and waxes took place at room temperature. The solution was then filtered through Filter-cel on filter cloth at room temperature in a closed system, using the pressure of the solvent, with additional nitrogen pressure if desired. The insoluble material removed amounted to 10% of the total weight of extract used. Part of the filtered solution was then placed in another pressure tube in contact with iron. After five days' standing, precipitation of dark and gummy substances began to take place on the iron while the original filtered solution in another pressure tube in the absence of iron remained unchanged. A portion of this original filtered solution was then subjected to cooling at $-15°$ for one-half hour and filtered at the same temperature. Precipitation of insoluble waxes and fats amounting to an additional 10% of the total extract used was obtained. This solution remained clear in the presence of iron even after a year's standing. This experiment indicates the advantage of our invention.

Example II

Kerosene extract of pyrethrum oleoresin obtained by extraction of pyrethrum flowers with ethylene dichloride was made up to the standard $CCl_2F_2$ aerosol solution as given in Example I. Immediate precipitation of waxes and resinous material took place. However, treatment of this solution by chilling to $-15°$ for one-half hour and filtration at this temperature, brought about wax elimination to such an extent that further precipitation did not occur in the presence of iron. Various commercial grades of 20% pyrethrum extracts when used in $CCl_2F_2$ insecticidal solutions behaved similarly. Subsequent cooling for one-half hour and filtering at $-15°$ C. brought about the elimination of any further wax precipitation when cooled to $-20°$ C. or when allowed to remain in iron cylinders for months. In the practice of our invention the loss of the active ingredients pyrethrins I and II did not exceed over 1% of the total active ingredients originally present in the extract used.

A very satisfactory operating temperature is about $-15°$ C., at which a cooling time of about thirty minutes produces an efficient precipitation of waxes to produce a filtrate stable in the presence of iron. Chilling and filtering may be carried out batchwise or continuously. Various concentrations of pyrethrins in the propellant solutions may be used.

A particular advantage of the invention is that propellant solutions of pyrethrins and propellants, particularly $CCl_2F_2$, are prepared which are stable in the presence of iron. Insecticide containers having spray orifices contain these solutions without the precipitation of deleterious amounts of waxes. The propellant solutions before the treatment contain a coloring matter which produces undesirable green stains on cloth. An additional advantage of the invention is that this treatment also removes that coloring matter.

As many apparently widely different embodiments of this invention may be made without departing from the spirit and scope thereof, it is to be understood that we do not limit ourselves to the specific embodiments thereof except as defined in the appended claims.

We claim:

1. The process of stabilizing a propellant solution of pyrethrins in $CCl_2F_2$ which solution normally tends to precipitate waxes and fats in the presence of iron at temperatures above $-20°$ C., which comprises the steps of chilling the solution to between about $-10°$ C. and about $-30°$ C. until wax precipitation has ceased and then separating the chilled solution from the precipitate.

2. The process of preparing propellant solutions of pyrethrins in $CCl_2F_2$ which are stable in the presence of iron, which comprises mixing a commercial grade of a kerosene extract of pyrethrum flowers with $CCl_2F_2$ in an amount sufficient to make an insecticidal solution containing about 93% by weight of $CCl_2F_2$, chilling the resultant solution to between about $-10°$ C. and about $-30°$ C. until wax precipitation has ceased and then separating the chilled solution from the precipitate.

3. The process of preparing propellant solutions of pyrethrins in $CCl_2F_2$ which are stable in the presence of iron, which comprises mixing a commercial grade of a kerosene extract of pyrethrum flowers with $CCl_2F_2$ in an amount sufficient to make an insecticidal solution containing about 93% by weight of $CCl_2F_2$, chilling the resultant solution to about $-15°$ C. until wax precipitation has ceased and then separating the chilled solution from the precipitate.

JOSEPH D. PARK.
WILLIAM W. RHODES.